(12) United States Patent
Rehman et al.

(10) Patent No.: US 7,678,844 B2
(45) Date of Patent: Mar. 16, 2010

(54) PIGMENTED INK-JET INKS WITH IMPROVED PRINT QUALITY AND RELIABILITY

(75) Inventors: Zia Rehman, Foxtail Corvallis, OR (US); Paul Tyrell, Corvallis, OR (US); Marlene McGorrin, Corvallis, OR (US); Mary E Austin, Corvallis, OR (US); Alexey S Kabalnov, Corvallis, OR (US); Patricia A Wang, Lake Oswego, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 186 days.

(21) Appl. No.: 10/807,025

(22) Filed: Mar. 22, 2004

(65) Prior Publication Data

US 2005/0209363 A1    Sep. 22, 2005

(51) Int. Cl.
*C09D 11/00* (2006.01)
(52) U.S. Cl. ........................ 523/160; 523/161
(58) Field of Classification Search ................. 523/160, 523/161
See application file for complete search history.

(56) References Cited

U.S. PATENT DOCUMENTS

| | | | |
|---|---|---|---|
| 5,462,592 A | 10/1995 | Murakami et al. | |
| 5,571,311 A * | 11/1996 | Belmont et al. | 106/31.28 |
| 5,846,307 A * | 12/1998 | Nagasawa et al. | 106/31.75 |
| 5,889,083 A * | 3/1999 | Zhu | 523/161 |
| 5,891,934 A * | 4/1999 | Moffatt et al. | 523/161 |
| 5,929,876 A * | 7/1999 | Bartolome | 347/20 |
| 5,948,155 A | 9/1999 | Yui et al. | |
| 5,952,401 A | 9/1999 | Kimura et al. | |
| 6,214,100 B1 * | 4/2001 | Parazak et al. | 106/31.6 |
| 6,221,142 B1 * | 4/2001 | Wang et al. | 106/31.6 |
| 6,280,513 B1 * | 8/2001 | Osumi et al. | 106/31.6 |
| 6,506,239 B1 | 1/2003 | Osumi et al. | |
| 6,652,055 B2 * | 11/2003 | Oikawa | 347/9 |
| 6,709,095 B2 * | 3/2004 | Sago et al. | 347/100 |
| 6,874,881 B2 * | 4/2005 | Suzuki et al. | 347/100 |
| 6,877,851 B2 * | 4/2005 | Watanabe | 347/100 |
| 2002/0107303 A1 * | 8/2002 | Miyabashi et al. | 523/160 |
| 2002/0198287 A1 * | 12/2002 | Ohta et al. | 523/160 |
| 2003/0196569 A1 * | 10/2003 | Yatake et al. | 106/31.58 |
| 2004/0020407 A1 | 2/2004 | Kato | |
| 2005/0027035 A1 * | 2/2005 | Wang et al. | 523/160 |
| 2005/0190244 A1 * | 9/2005 | Tyrell | 347/100 |

FOREIGN PATENT DOCUMENTS

| | | |
|---|---|---|
| EP | 1 114 851 | 7/2001 |
| JP | 10-168373 | 6/1998 |
| JP | 2001-254039 | 9/2001 |
| JP | 2002-309140 | 10/2002 |
| JP | 2003-213166 | 7/2003 |
| JP | 2003-213180 | 7/2003 |
| JP | 2004-35697 | 2/2004 |
| WO | WO 03/057787 | 7/2003 |

* cited by examiner

*Primary Examiner*—Edward J Cain

(57) ABSTRACT

Compositions, systems, and methods of printing an ink-jet image are provided. The composition can include a liquid vehicle including water, a liquid vehicle having from 5 wt % to 35 wt % of total organic solvent content; from 1 wt % to 6 wt % of acid-functionalized pigment solids; and from 0.001 wt % to 6 wt % of styrene-maleic anhydride copolymer, said styrene-maleic anhydride copolymer having a weight average molecular weight from about 400 Mw to 15,000 Mw.

25 Claims, No Drawings

PIGMENTED INK-JET INKS WITH IMPROVED PRINT QUALITY AND RELIABILITY

FIELD OF THE INVENTION

The present invention relates generally to ink-jet ink compositions. More particularly, the present invention relates to pigment-based ink-jet inks that exhibit improved print quality and reliability, even after long term storage periods.

BACKGROUND OF THE INVENTION

There are several reasons that ink-jet printing has become a popular way of recording images on various media surfaces, particularly paper. Some of these reasons include low printer noise, capability of high-speed recording, and multi-color recording. Additionally, these advantages can be obtained at a relatively low price to consumers. Though there has been great improvement in ink-jet printing, accompanying this improvement are increased demands by consumers in this area, e.g., higher speeds, higher resolution, full color image formation, increased stability, etc. As new ink-jet inks and print engines are developed, there have been several traditional characteristics to consider when evaluating the ink in conjunction with a printing surface or substrate. Such characteristics include edge acuity and optical density of the image on the surface, gloss, black to color bleed control, dry time of the ink on the substrate, adhesion to the substrate, lack of deviation in ink droplet placement, presence of all dots, resistance of the ink after drying to water and other solvents, long term storage stability, and long term reliability without pen material degradation or nozzle clogging. The long term reliability without material degradation or nozzle clogging becomes even more important with the advent of print engines that eject smaller drop volumes. Though the above list of characteristics provides a worthy goal to achieve, there are difficulties associated with satisfying all of the above characteristics. Often, the inclusion of an ink component meant to satisfy one of the above characteristics can prevent another characteristic from being met. Thus, most commercial inks for use in ink-jet printers represent a compromise in an attempt to achieve at least an adequate response in meeting all of the above listed requirements.

One characteristic of ink-jet printing systems that is desirable to achieve is related to frequency response of the ink-jet ink, which is often proportional to ink throughput. Smaller drop sizes have increased the demand for higher frequency printing. With respect to this aspect, obtaining increased printing speed while retaining acceptable print quality is a constant challenge in the ink-jet printing industry.

With respect to other aspects, improvement in black ink print quality, particularly with respect to optical density and bleed control, has been a consideration in the advancement of the ink-jet arts. Additionally, achieving acceptable optical density and bleed control in print reliable systems is also a consideration. For example, in one aspect, many ink-jet printing customers in the home printing market will often use a printer infrequently, or have lengthy breaks from use. Thus, some customers require reliable printing after long periods of down time, such as may occur as a result of a vacation or as a result of a summer break for students. As such, inks for such markets would benefit from formulations having long term storage stability in bottles, in print cartridges, and when loaded in a printer.

Accordingly, investigations continue into developing ink formulations that can be printed accurately at high frequencies, and which have good print quality and storage stability.

SUMMARY OF THE INVENTION

It has been recognized that it would be advantageous to develop pigment-based ink compositions that have improved frequency response, as well as good print quality and storage stability.

In one aspect of the present invention, a system for printing images on a substrate can comprise an ink-jet ink and a printhead loaded with the ink-jet ink. The ink-jet ink can include a liquid vehicle, from 0.1 wt % to 6 wt % of acid-functionalized pigment solids, and from 0.001 wt % 6 wt % of styrene-maleic anhydride copolymer. In a more detailed aspect, the liquid vehicle can include water and from 5 wt % to 35 wt % of total organic solvent content and the styrene-maleic anhydride copolymer can have a weight average molecular weight from about 400 Mw to 15,000 Mw.

In another embodiment, a method of rapidly printing an ink-jet image can comprise ink-jetting an ink-jet ink onto a media substrate at a firing frequency from 12 kHz to 25 kHz. The ink-jet ink can include a liquid vehicle, from 0.1 wt % to 6 wt % of acid-functionalized pigment solids, and from 0.001 wt % 6 wt % of styrene-maleic anhydride copolymer. In this embodiment, the liquid vehicle can include water and from 5 wt % to 35 wt % of total organic solvent content and the styrene-maleic anhydride copolymer can have a weight average molecular weight from about 400 Mw to 15,000 Mw.

In another embodiment, an ink-jet ink composition can comprise a liquid vehicle, from 0.1 wt % to 6 wt % of acid-functionalized pigment solids, and from 0.001 wt % to 6 wt % of styrene-maleic anhydride copolymer. In a more detailed aspect, the liquid vehicle can include water and from 5 wt % to 35 wt % of total organic solvent content and the styrene-maleic anhydride copolymer can have a weight average molecular weight from about 400 Mw to 15,000 Mw.

Additional features and advantages of the invention will be apparent from the detailed description which illustrates, by way of example, features of the invention.

DETAILED DESCRIPTION OF THE PREFERRED EMBODIMENT(S)

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a pigment" includes reference to one or more of such materials.

As used herein, "liquid vehicle" is defined to include liquid compositions that can be used to carry colorants, including pigments, to a substrate. Liquid vehicles are well known in the art, and a wide variety of liquid vehicle components may be used in accordance with embodiments of the present invention. Such liquid vehicles may include a mixture of a variety of different agents, including without limitation, surfactants, co-solvents, buffers, biocides, viscosity modifiers, sequestering agents, stabilizing agents, and water. Though not liquid per se, the liquid vehicle can also carry other solids, such as polymers, UV curable materials, plasticizers, salts, etc.

As used herein, "pigment" refers to a colorant particle which is typically substantially insoluble in the liquid vehicle in which it is used.

"Acid-functionalized pigment" or a derivation thereof, refers to pigments that have been functionalized with acidic dispersing agent, such as by chemical attachment of the acidic dispersing agent to the surface of the pigment. Dispersing agent can be attached to such pigments to terminate the outer shell of the pigment with a charge, thereby creating a repulsive nature that reduces agglomeration of pigment particles within the liquid vehicle. Exemplary acids that can be attached to the surface of such pigments include para-aminobenzoic acids, isophthalic acids, triacids, and isomers and combinations thereof. After acid function attachment, these pigments can be present in their salt forms. Exemplary of counter-ions that can be present include ammonium, sodium, potassium, and lithium.

"Frequency response" refers to the performance of ink-jet ink and ink-jet architecture used in combination with respect to ink-jet ink firing speed, e.g., dots fired per unit of time. Generally, a nozzle firing frequency that is higher than contemplated for use with respect to a specific ink-jet ink and ink-jet architecture can result in poorer print performance, such as by producing misdirected ink drops and other undesirable characteristics. By current standards, firing frequencies above about 12 kHz are considered to be fast printing frequencies.

As used herein, "triacid" refers to organic groups that contain three or more acidic groups. More preferably, the organic group can be alkyl, phenyl, or naphthyl, and the acidic group can be sulfonic acid, sulfinic acid, phosphonic acid, or carboxylic acid. Examples include —COOH, —SO$_3$H, —PO$_3$H$_2$, —SO$_2$NH$_2$, —SO$_2$NHCOR, and their salts. For example, —COO$^-$Na$^+$, —COO$^-$K$^+$, —COO$^{-NR}$$_4$$^+$, —SO$_3$$^-$Na$^+$, —HPO$_3$$^-$Na$^+$, —SO$_3$—NR$_4$$^+$, and PO$_3$Na$_2$ can be used, where R is an alkyl or phenyl group, for example. For instance, R can be a C$_1$ to C$_{20}$ alkyl group. Particularly preferred ionizable substituents include —COOH and —SO$_3$H, and their ammonium, lithium, sodium, and/or potassium salts.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

As used herein, "bleed" refers to the tendency of ink to run into and mix with adjacently printed inks. "Feathering" refers to the tendency of ink to spread undesirably into unprinted areas of the media substrate. Bleed and feathering typically occur prior to the printed inks fully drying on a substrate. The degree of bleed will depend on a variety of factors such as the drying speed of the ink, agglomeration of the colorant, ink chemistry in general, among other variables.

"Edge acuity" refers to the crispness of a printed image along the border of the image.

The term "about" when referring to a numerical value or range is intended to encompass the values resulting from experimental error that can occur when taking measurements.

In accordance with the present invention, a system for printing images on a substrate can comprise an ink-jet ink and a printhead loaded with the ink-jet ink. The ink-jet ink can include a liquid vehicle, from 0.1 wt % to 6 wt % of acid-functionalized pigment solids, and from 0.001 wt % 6 wt % of styrene-maleic anhydride copolymer. In a more detailed aspect, the liquid vehicle can include water and from 5 wt % to 35 wt % of total organic solvent content and the styrene-maleic anhydride copolymer can have a weight average molecular weight from about 400 Mw to 15,000 Mw.

In another embodiment, a method of rapidly printing an ink-jet image can comprise ink-jetting an ink-jet ink onto a media substrate at a firing frequency from 12 kHz to 25 kHz. The ink-jet ink can include a liquid vehicle, from 0.1 wt % to 6 wt % of acid-functionalized pigment solids, and from 0.001 wt % 6 wt % of styrene-maleic anhydride copolymer. In this embodiment, the liquid vehicle can include water and from 5 wt % to 35 wt % of total organic solvent content and the styrene-maleic anhydride copolymer can have a weight average molecular weight from about 400 Mw to 15,000 Mw.

In another embodiment, an ink-jet ink composition can comprise a liquid vehicle, from 0.1 wt % to 6 wt % of acid-functionalized pigment solids, and from 0.001 wt % 6 wt % of styrene-maleic anhydride copolymer. In a more detailed aspect, the liquid vehicle can include water and from 5 wt % to 35 wt % of total organic solvent content and the styrene-maleic anhydride copolymer can have a weight average molecular weight from about 400 Mw to 15,000 Mw.

The ink-jet ink compositions of the present invention are typically prepared using an aqueous formulation or liquid vehicle which can include water, co-solvents, surfactants, buffering agents, biocides, sequestering agents, viscosity modifiers, humectants, binders, and/or other known additives. Solids can also be present, such as pigment solids and other polymeric solids. In one aspect of the present invention, the liquid vehicle can comprise from about 70 wt % to about 99 wt % of the ink-jet ink composition.

Frequency response of a pigmented ink-jet inks can be proportional to the printer system throughput ability. In ink-jet printing systems, it can be desirous to provide ink and architecture systems that can exhibit a high upper frequency limit while maintaining a functional frequency bandwidth within a lower range. In the prior art, a typical and understood solution to increasing pen system frequency range, and upper frequency limits particularly, has involved designing jetting architecture to accommodate the requirements of a given ink. However, it has been discovered that the use of certain components in combination can increase the range of frequency response for a given ink-jet architecture and ink-jet ink combination, as well as provide ink-jet inks that are stable over long periods of dormancy. Additionally, these combinations can provide ink-jet inks that have high print quality, e.g., high optical density, reduced bleed, reduced misdirected firing, etc. Further, not only is better performance noted at these higher frequency levels, but the operational frequency bandwidth can also be expanded using the combinations disclosed herein. For example, by increasing the upper frequency limit that can be used to jet a particular ink-jet ink, the effective range of frequency response of an ink can be increased. Thus, in one embodiment, a printhead can be configured to jet the ink-jet ink of the present invention at a firing frequency from 12 kHz to 25 kHz, or even from 15 kHz to 25 kHz or 18 kHz to 25 kHz, in some embodiments. Though a high frequency range is provided, these same inks can also be jetted at from 3 kHz to 12 kHz as well, which is more common amongst many of the inks currently available on the market. Thus, the frequency response range of these ink-jet inks can be quite broad, e.g., from 3 kHz to 25 kHz. These firing frequencies can be at any functional drop volume, though drop volumes from about 10 pL to 20 pL can be desirable in providing a balance between printing speed and image quality.

As mentioned, the ingredients that can be present in these ink-jet inks in accordance with embodiments of the present invention include acid-functionalized pigment solids, and styrene-maleic anhydride copolymer, organic co-solvent(s), and water. Optionally, other components can also be present including salts, surfactants, biocides, buffers, viscosity modifiers, sequestering agents, stabilizing agents, polymers, UV curable materials, plasticizers, etc.

Acid-Functionalized Pigment

The acid-functionalized pigment can be of any color used in the ink-jet arts. Though any color can be used, black carbon pigments are described in an exemplary manner to favorably set forth certain principles of the invention. Specifically, in this embodiment, a carbon pigment can be functionalized with an acidic dispersant. The acidic dispersant is typically prepared in a precursor form, and then the precursor is attached to the pigment to chemically modify the surface of the pigment. In one embodiment, the dispersant can be attached to the carbon black using various acidic precursor materials, such as para-aminobenzoic acids, isophthalic acids, triacids, and isomers thereof, for example. Other acidic precursors can also be used to attach to the carbon black, as would be known by those skilled in the art.

The carbon pigment can be almost any commercially available carbon pigment that provides acceptable optical density and print characteristics. Carbon pigments suitable for use in the present invention include, without limitation, carbon black, graphite, vitreous carbon, charcoal, and combinations thereof. In one aspect of the present invention, the carbon pigment is a carbon black pigment. Such carbon black pigments can be manufactured by a variety of known methods such as a channel method, a contact method, a furnace method, an acetylene method, or a thermal method, and are commercially available from such vendors as Cabot Corporation, Columbian Chemicals Company, Degussa A G, and E.I. DuPont de Nemours and Company. Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, and CAB-O-JET 300; Columbian pigments such as RAVEN 7000, RAVEN 5750, RAVEN 5250, RAVEN 5000, and RAVEN 3500; Degussa pigments such as Color Black FW 200, RAVEN FW 2, RAVEN FW 2V, RAVEN FW 1, RAVEN FW 18, RAVEN S160, RAVEN FW S170, Special Black 6, Special Black 5, Special Black 4A, Special Black 4, PRINTEX U, PRINTEX 140U, PRINTEX V, and PRINTEX 140V; and TIPURE R-101 available from Dupont.

Typically the carbon black pigments of the present invention can be from about 5 nm to about 10 μm and in one aspect can be from 10 nm to about 500 nm in size, although sizes outside this range can be used if the pigment can remain dispersed and provide adequate color properties. In one detailed aspect of the present invention, the functionalized carbon pigment comprises from about 0.1 wt % to about 6 wt % of the ink-jet ink composition.

Though black pigments are described in some detail above, other pigment colors can also be used. For example, other pigments that can be used include color pigments from Cabot, such as CAB-O-JET 250C, CAB-O-JET 260M, and CAB-O-JET 270Y.

Styrene-Maleic Anhydride Copolymers

In addition to the pigment solids that can be present in the ink-jet inks of the present invention, a styrene-maleic anhydride copolymer (SMA) can also be present. When referring to styrene-maleic anhydride copolymers, both the anhydride form and the salt form is included. Styrene-maleic anhydride copolymers can be generally depicted in accordance with Formula 1a as follows:

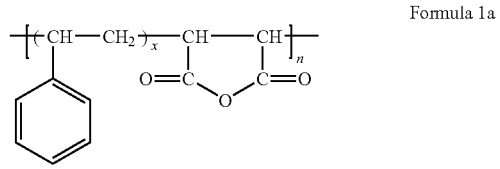

Formula 1a where x can be from 1 to 4, and n can be from 2 to 27. With respect to x, the structure shown in Formula 1a is not intended to imply that any particular positional order is present, but merely that when x is 1, the styrene to maleic anhydride molar ratio of the resin is 1:1; when x is 2, the styrene to maleic anhydride molar ratio of the resin is 2:1; when x is 3, the styrene to maleic anhydride molar ratio of the resin is 3:1; and when x is 4, the styrene to maleic anhydride molar ratio of the resin is 4:1. Typically, the styrene units and the maleic anhydride units can be positioned somewhat randomly. As apparent by Formula 1, styrene-maleic anhydride resins are a family of low molecular weight copolymers of styrene and maleic anhydride. Various resins can have a variety of chemical structures and can exhibit a variety of properties, including high acid equivalent values, acceptable thermal stability, and high glass transition temperature (Tg).

In order to adjust the solubility in a liquid vehicle, the styrene maleic anhydride polymers can be partially or totally hydrolyzed. Hydrolysis tends to increase water solubility. A preferred structure resulting from hydrolysis is shown in Formula 1b.

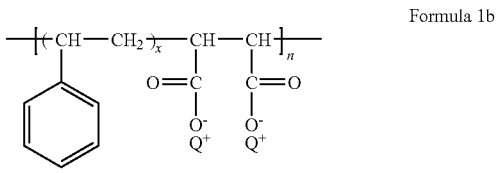

Formula 1b where x can be from 1 to 4, n can be from 2 to 27, and Q can be any functional cation. Exemplary cations include sodium, potassium, lithium, ammonium, or mixtures thereof.

In one specific embodiment, an ammonium salt of styrene-maleic anhydride that can be used, as is shown in Formula 2 below:

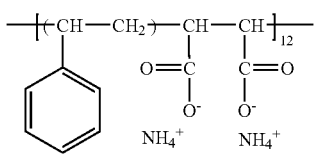

Formula 2

As can be seen by Formula 2, the styrene to maleic anhydride molar ratio of the resin is about 1:1, and there are 12 repeating units (in no particular order). Additionally, Formula 2 shows the composition in the form of an ammonium salt rather than in the anhydride form. Various other cations can be substituted in place of ammonium ions to provide additional ink-jet properties that are desirable. For example, sodium ($Na^+$), potassium ($K^+$), lithium ($Li^+$), etc.

The use of a composition in accordance with Formula 1 can provide ink-jet ink properties that are desirable in accordance with embodiments of the present invention. In one embodiment, the styrene-maleic anhydride can be present in the ink-jet ink composition at from 0.001 wt % to 6 wt %, though this range is not intended to be limiting. Additionally, in accordance with the molar ratio of styrene to maleic anhydride, and in accordance with the number of repeating units described in Formula 1, the weight average molecular weight of the styrene-maleic anhydride copolymer that can be used can be from 400 Mw to 15,000 Mw.

A second useful form of a styrene-maleic anhydride copolymer is a partial monoester of styrene-maleic anhydride copolymer. This form can be generally depicted in accordance with Formula 3 as follows:

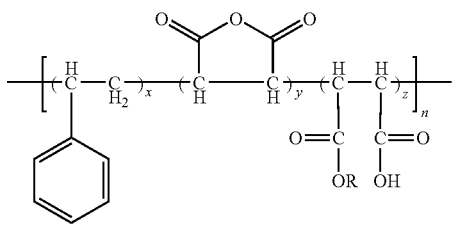

Formula 3 where x can be from 1 to 4, y can be a fraction from 0 to 1, z can be a fraction from 0 to 1, R can be alkyl, aryl, alkoxyl, substituted alkyl, substituted aryl, or substituted alkoxyl, and n can be from 2 to 27. The subunits within each of the n units in the polymer may be different. For example, when x is 1, each of the units contains one styrene subunit, from 0 to 1 maleic anhydride subunit, and from 0 to 1 monoester maleic anhydride subunit, such that the average molar ratio over all n units in the polymer is 1:y:z, where y and z can include fractional numbers from 0 to 1. With respect to x, y and z, the structure shown in Formula 3 is not intended to imply that any particular positional order is present, but merely that when x is 1, the styrene to maleic anhydride to partial monoester molar ratio of the resin is 1:y:z. When x is 2, the styrene to maleic anhydride to partial monoester molar ratio of the resin is 2:y:z; when x is 3, the styrene to maleic anhydride to partial monoester molar ratio of the resin is 3:y:z; when x is 4, the styrene to maleic anhydride to partial monoester molar ratio of the resin is 4:y:z, where y and z can include fractional numbers from 0 to 1. Typically, the styrene units, the maleic anhydride units, the monoester units can be positioned somewhat randomly. As apparent by Formula 3, partial monoester styrene-maleic anhydride resins are a family of low molecular weight copolymers of styrene and partially monoesterized maleic anhydride. Various resins can have a variety of chemical structures and can exhibit a variety of properties, including mid to high acid equivalent values, polymer surfactant properties, excellent compatibility with a broad range of formulation ingredients, and increased solvent solubility. In its salt form, the salt of the partial monoester of styrene-maleic anhydride can be an ammonium salt, a lithium salt, a sodium salt, or a potassium salt, for example. In such an embodiment, the maleic anhydride unit can each include two counter ions (as exemplified in Formula 2), and the monoester units can each include one counter ion at the carboxy group.

A third useful form of styrene-maleic anhydride copolymers is a polymer which is a partial monoester of styrene-maleic anhydride and a mixture of two alcohols. This form can be generally depicted in accordance with Formula 4 as follows:

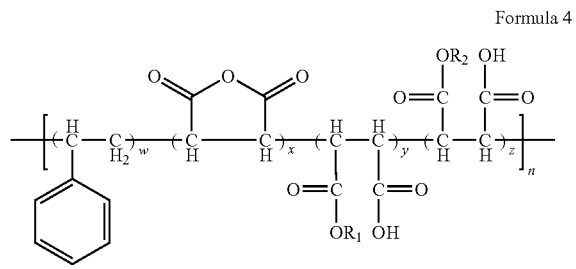

Formula 4 where w can be from 1 to 4, x can be a fraction from 0 to 1, y can be a fraction from 0 to 1, z can be a fraction from 0 to 1, $R_1$ and $R_2$ can independently be alkyl, aryl, alkoxyl, substituted alkyl, substituted aryl, or substituted alkoxyl, and n can be from 2 to 27. The subunits within each of the n units in the polymer may be different. For example, when w is 1, each of the n units contains one styrene subunit, from 0 to 1 maleic anhydride subunit, from 0 to 1 $R_1$ monoester maleic anhydride subunit, and from 0 to 1 $R_2$ monoester maleic anhydride subunit, such that the average molar ratio over all n units in the polymer is 1:x:y:z. With respect to w, x, y, and z, the structure shown in Formula 4 are not intended to imply that any particular positional order is present, but merely that when w is 1, the styrene to maleic anhydride to $R_1$ monoester maleic anhydride to $R_2$ monoester maleic anhydride subunit molar ratio of the resin is 1:x:y:z. When x is 2, the styrene to maleic anhydride to $R_1$ monoester maleic anhydride to $R_2$ monoester maleic anhydride subunit molar ratio of the resin is 2:x:y:z; when x is 3, the styrene to maleic anhydride to $R_1$ monoester maleic anhydride to $R_2$ monoester maleic anhydride subunit molar ratio of the resin is 3:x:y:z; and when x is 4, the styrene to maleic anhydride to $R_1$ monoester maleic anhydride to $R_2$ monoester maleic anhydride subunit molar ratio of the resin is 4:x:y:z. Typically, the styrene units and the maleic anhydride units and the $R_1$ monoester units and the $R_2$ monoester maleic anhydride units can be positioned somewhat randomly.

As apparent by Formula 4, partial monoester styrene-maleic anhydride resins are a family of low molecular weight copolymers of styrene and partially monoesterized maleic anhydride and two alcohols. Various resins can have a variety of chemical structures and can exhibit a variety of properties, including high acid equivalent values, polymer surfactant properties, excellent compatibility with a broad range of formulation ingredients, increased solvent solubility, high thermal stability, and high glass transition temperature (Tg). In its salt form, the salt of the partial monoester of styrene-maleic anhydride can be an ammonium salt, a lithium salt, a sodium salt, or a potassium salt, for example. In such an embodiment, the maleic anhydride unit can each include two counter ions (as exemplified in Formula 2), and each of the monoester units can each include one counter ion at the carboxy group.

A fourth useful form of a styrene-maleic anhydride copolymer is a styrene-maleic anhydride resin amic acid copolymer. This form can be generally depicted in accordance with Formula 5 as follows:

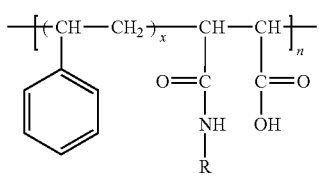

Formula 5 where x can be from 1 to 4, R can be alkyl, aryl, alkoxyl, substituted alkyl, substituted aryl, or substituted alkoxyl, for example, and n can be from 2 to 27. With respect to x, the structure shown in Formula 7 is not intended to imply that any particular positional order is present, but merely that when x is 1, the styrene to maleic anhydride amic acid molar ratio of the resin is 1:1; when x is 2, the styrene to maleic anhydride amic acid molar ratio of the resin is 2:1; when x is 3, the maleic anhydride amic acid molar ratio of the resin is 3:1; and when x is 4, the styrene to maleic anhydride amic acid molar ratio of the resin is 4:1. Typically, the styrene units and the maleic anhydride amic acid units can be positioned somewhat randomly. Various resins can have a variety of chemical structures and can exhibit a variety of properties, including thermal stability and surfactant properties. As a salt, the composition can be in the form of an ammonium salt, a lithium salt, a sodium salt, or a potassium salt, for example.

Though the above examples of types of styrene-maleic anhydride copolymers are specifically described, other that are functional in accordance with embodiments of the present invention can also be used. Some purposes for inclusion of styrene-maleic anhydride in the ink-jet ink composition is that it provides good black to color bleed control, provides improved optical density (OD), and helps to stabilize the pigments in the dispersion, thereby improving the reliability of ink-jet printhead.

Liquid Vehicle Components

As described previously, a liquid vehicle can be used to carry the pigment solids and the styrene-maleic anhydride, as well as other solids that may be present in the ink-jet ink compositions of the present invention. More specifically, the liquid vehicle can include water, and from 5 wt % to 35 wt % total organic solvent content, along with other optional liquid components. With respect to the total organic co-solvent content, co-solvents for use in the present invention include, but are not limited to, aliphatic alcohols, aromatic alcohols, diols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, co-solvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides. Specific examples of co-solvents that are preferably employed in the practice of this invention include, but are not limited to, 1,5-pentanediol, 2-pyrrolidone, Liponic ethylene glycol 1, Liponic ethylene glycol 7,2-methyl-2,4-pentanediol, 2-methyl- 1,3-propanediol, 2-ethyl-2-hydroxymethyl-1,3-propanediol, diethylene glycol, 3-methoxybutanol, and 1,3-dimethyl-2-imidazolidinone, In one embodiment, the organic co-solvent content can include at least three of the following solvents: 1,5-pentanediol, ethoxylated glycerol, 1,2-pyrrolidinone, and 2-methyl-1,3-propanediol. Co-solvents can be added to reduce the rate of evaporation of water in the ink to minimize clogging or other properties of the ink such as viscosity, PH, surface tension, optical density, and print quality.

Other additives, such as ammonium salts and other salts, can also be included, such as at from 0.1 wt % to 4 wt % in one embodiment. Examples of such salts include ammonium acetate, ammonium sulfate, ammonium benzoate, potassium acetate, sodium acetate, sodium xylene sulfonate, potassium tartarate, sodium tartarate, lithium tartarate. If used, the presence of an ammonium salt can improve edge acuity and reduce bleed of printed images. Ammonium salts can be preferred for use to achieve acceptable waterfastness on certain state of the art printing media.

Various buffering agents can also be optionally used in the ink-jet ink compositions of the present invention. Typical buffering agents include such pH control solutions as hydroxides of alkali metals and amines, such as lithium hydroxide, sodium hydroxide, potassium hydroxide; citric acid; amines such as triethanolamine, diethanolamine, and dimethylethanolamine; and other basic or acidic components. If used, buffering agents typically comprise less than about 10 wt % of the ink-jet ink composition.

In another aspect of the present invention, various biocides can be used to inhibit growth of undesirable microorganisms. Several non-limiting examples of suitable biocides include benzoate salts, sorbate salts, commercial products such as NUOSEPT (Nudex, Inc., a division of Huls America), UCARCIDE (Union Carbide), VANCIDE (RT Vanderbilt Co.), and PROXEL (ICI Americas) and other known biocides. Typically, such biocides comprise less than about 5 wt % of the ink-jet ink composition and often from about 0.05 wt % to about 2 wt %.

In an additional aspect of the present invention, binders can be included which act to secure the colorants on the substrate. These binders can be added in addition to the styrene-maleic anhydride copolymers described previously. Binders suitable for use in the present invention typically have a molecular weight of from about 100 to about 50,000 g/mole. Non-limiting examples include polyester, polyester-melanine, styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl naphthalene-acrylic acid copolymers, vinyl naphthalene-maleic acid copolymers, and salts thereof. If the binder is in a particulate dispersed form, then it is not considered to be part of the liquid vehicle, but is considered to be carried by liquid vehicle.

In one aspect of the present invention, the ink-jet ink compositions are substantially free of surfactants. However, such components can be used and may include standard water-soluble surfactants such as alkyl polyethylene oxides, alkyl phenyl polyethylene oxides, polyethylene oxide (PEO) block copolymers, acetylenic PEO, PEO esters, PEO amines, PEO amides, and dimethicone copolyols. If used, surfactants can be present at from 0.001 wt % to 10 wt % of the ink-jet ink composition, and in one embodiment, can be present at from 0.001 wt % to 0.1 wt %.

EXAMPLE

The following example illustrates the embodiments of the invention that are presently best known. However, it is to be understood that the following is only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following example provides further detail in connection with what is presently deemed to be the most practical and preferred embodiments of the invention.

Example 1

A black pigmented ink-jet ink in accordance with the present invention was prepared using components within the ranges shown in Table 1. The components were combined to form a black ink having a pH of about 8.

TABLE 1

| Component | Test (wt %) |
|---|---|
| Ethoxylated glycerol | 2-8 |
| 1,5-pentanediol | 2-8 |
| 2-pyrrolidinone | 5-10 |
| 2-methyl-1,3-propanediol | 0.5-5 |
| Styrene-maleic anhydride copolymer (Formula 2) | 0.2-2 |
| Surfynol 465 | 0.005-0.5 |
| Acid-functionalized black pigment(s) solids | 2-6* |
| TRIS buffer (free base) | 0-0.5 |
| Ammonium benzoate | 0.05-2 |
| Proxel GXL | 0.01-1 |
| Water | balance |

*One or more acid functionalized pigment having a total solids wt % from 2 wt % to 6 w % in the present example.

Ammonium hydroxide or nitric acid can be used to adjust the pH to about 8.0 as is needed due to compositional differences within the ranges set forth in Table 1. For example, two different acid-functionalized pigments can be blended at from a 1:3 to a 3:1 weight ratio. In the present example, a first pigment is functionalized with para-aminobenzoic acid and a second pigment is functionalized with isophthalic acid.

Variations of the formulation set forth in Table 1 are tested in identical pen/printer/media systems for frequency response and misdirected firing. The pen used is an HP C6656A, the paper used is Hewlett-Packard Plain Paper, and the printer used is an HP Photosmart 7000 series. After preparing the various inks for testing, a one page print diagnostic is conducted to discern print attributes. The diagnostics utilized are chosen to highlight nozzle performance across a range of firing frequencies (throughput), as well as to determine print quality. Specifically, each of the inks prepared were fired over a range from 3.0 kHz to 19.8 kHz. The frequency response diagnostic is designed to print a series of fired dots in a linear line. Deviation from the desired linearity was evident by observing overlapping adjacent dot rows. This overlap results in dark and light lines commonly referred to as banding or striping. The inks prepared in accordance with the Table 1 ranges typically perform acceptably. Additionally, acceptable bleed and improved edge acuity, as well as other print quality characteristics, are achievable using the inks prepared in accordance with Table 1.

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:

1. A system for printing images on a substrate, comprising:
    a) an ink-jet ink including:
        i) a liquid vehicle including water, and from 5 wt % to 35 wt % total organic solvent content, wherein the organic solvent content includes at least three of 1,5-pentanediol, ethoxylated glycerol, 2-pyrrolidinone, and 2-methyl-1,3-propanediol;
        ii) from 0.1 wt % to 6 wt % of acid-functionalized pigment solids;
        iii) from 0.001 wt % to 6 wt % of styrene-maleic anhydride copolymer, said styrene-maleic anhydride copolymer having a weight average molecular weight from about 400 Mw to 15,000 Mw.
    b) a printhead loaded with the ink-jet ink and configured for jetting the ink-jet ink at a firing frequency from 12 kHz to 25 kHz, and wherein the frequency response range for the ink-jet ink is such that the ink-jet ink is jettable at from 3 kHz to 25 kHz.

2. The system of claim 1, wherein the acid-functionalized pigment solids have an average size from about 5 nm to about 10 µm.

3. The system of claim 1, wherein the ink-jet ink further comprises from 0.001 wt % to 0.3 wt % surfactant.

4. The system of claim 1, wherein the ink-jet ink further comprises from 0.05 wt % to 4 wt % of a salt selected from the group consisting of ammonium salt, sodium salt, potassium salt, and lithium salt.

5. The system of claim 4, wherein the ammonium salt is ammonium benzoate.

6. The system of claim 1, wherein an acid precursor used to form the acid-functionalized pigment is selected from the group consisting of para-aminobenzoic acids, isophthalic acids, triacids, and combinations thereof.

7. The system of claim 1, wherein the printhead is configured for jetting the ink-jet ink at a drop volume from about 10 pL to 20 pL.

8. The system of claim 1, wherein the ink-jet ink further comprises a trishydroxymethylaminomethane buffer.

9. A method of rapidly printing an ink-jet image, comprising ink-jetting an ink-jet ink onto a media substrate at a firing frequency from 12 kHz to 25 kHz, said ink-jet ink comprising:
    a) a liquid vehicle including water, and from 5 wt % to 35 wt % total organic solvent content, wherein the organic solvent content includes at least three of 1,5-pentanediol, ethoxylated glycerol, 2-pyrrolidinone, and 2-methyl-1,3-propanediol;

b) from 0.01 wt % to 6 wt % of acid-functionalized pigment solids;

c) from 0.001 wt % to 6 wt % of styrene-maleic anhydride copolymer, said styrene-maleic anhydride copolymer having a weight average molecular weight from about 400 Mw to 15,000 Mw, wherein the frequency response range for the ink-jet ink is such that the ink-jet ink is jettable at from 3 kHz to 25 kHz.

10. The method of claim 9, wherein the acid-functionalized pigment solids have an average size from about 5 nm to about 10 μm.

11. The method of claim 9, wherein the ink-jet ink further comprises from 0.001 wt % to 0.3 wt % surfactant.

12. The method of claim 9, wherein the ink-jet ink further comprises from 0.05 wt % to 4 wt % of an ammonium salt.

13. The method of claim 12, wherein the ammonium salt is ammonium benzoate.

14. The method of claim 9, wherein an acid precursor used to form the acid-functionalized pigment is selected from the group consisting of para-aminobenzoic acids, isophthalic acids, triacids, and combinations thereof.

15. The method of claim 9, wherein the firing frequency is from 15 kHz to 25 kHz.

16. The method of claim 9, wherein ink-jetting step is at a drop volume from about 10 pL to 20 pL.

17. The method of claim 9, wherein the ink-jet ink further includes a trishydroxymethylaminomethane buffer.

18. An ink-jet ink composition, comprising:

a) a liquid vehicle having from 5 wt % to 35 wt % of total organic solvent content, wherein the organic solvent content includes at least three of 1,2-pentanediol, ethoxylated glycerol, 2-pyrrolidinone, and 2-methyl-1,3-propanediol;

b) from 0.1 wt % to 6 wt % of acid-functionalized pigment solids;

c) from 0.001 wt % to 6 wt % of styrene-maleic anhydride copolymer, said styrene-maleic anhydride copolymer having a weight average molecular weight from about 400 Mw to 15,000 Mw;

wherein the ink-jet ink composition is reliably jettable at all firing frequencies ranging from 3 kHz to 25 kHz.

19. The ink-jet ink composition of claim 18, wherein the acid-functionalized pigment solids have an average size from about 5 nm to about 10 μm.

20. The ink-jet ink composition of claim 18, wherein the ink-jet ink further comprises from 0.001 wt % to 0.3 wt % surfactant.

21. The ink-jet ink composition of claim 18, wherein the ink-jet ink further comprises from 0.05 wt % to 4 wt % of an ammonium salt.

22. The ink-jet composition of claim 21, wherein the ammonium salt is ammonium benzoate.

23. The ink-jet ink composition of claim 18, wherein an acid precursor used to form the acid-functionalized pigment is selected from the group consisting of para-aminobetizoic acids, isophthalic acids, triacids, and combinations thereof.

24. The ink-jet ink composition of claim 18, wherein the ink-jet ink composition is reliably jettable at a drop volume from about 10 pL to 20 pL.

25. The ink jet ink composition of claim 18, wherein the ink-jet ink further includes a trishydroxymethlyaminomethane buffer.

* * * * *

UNITED STATES PATENT AND TRADEMARK OFFICE
CERTIFICATE OF CORRECTION

PATENT NO. : 7,678,844 B2  
APPLICATION NO. : 10/807025  
DATED : March 16, 2010  
INVENTOR(S) : Zia Rehman et al.

Page 1 of 1

It is certified that error appears in the above-identified patent and that said Letters Patent is hereby corrected as shown below:

In column 12, line 33, in Claim 1, delete "Mw." and insert --Mw; --, therefor.

In column 12, line 66, in Claim 9, delete "ethyoxylated" and insert -- ethoxylated --, therefor.

In column 14, line 23, in Claim 23, delete "aminobetizoic" and insert -- aminobenzoic --, therefor.

Signed and Sealed this
Twenty-fourth Day of May, 2011

David J. Kappos
*Director of the United States Patent and Trademark Office*